T. L. SHAW.

SAW FILER AND SETTER.

No. 7,632. Reissued April 24, 1877.

WITNESSES:

W. W. Hollingsworth

Edw. U. Byrn.

INVENTOR:

Thomas L. Shaw

BY

Munn & Co.

ATTORNEYS.

UNITED STATES PATENT OFFICE.

THOMAS L. SHAW, OF OMAHA, NEBRASKA.

IMPROVEMENT IN SAW FILERS AND SETTERS.

Specification forming part of Letters Patent No. 112,970, dated March 21, 1871; reissue No. 7,632, dated April 24, 1877; application filed March 23, 1877.

*To all whom it may concern:*

Be it known that I, THOMAS L. SHAW, of Omaha, in the county of Douglas and State of Nebraska, have invented a new and Improved Saw Filing and Setting Machine; and I do hereby declare that the following is a full, clear, and exact description of the same, reference being had to the accompanying drawing, forming a part of this specification, in which—

Figure 1:
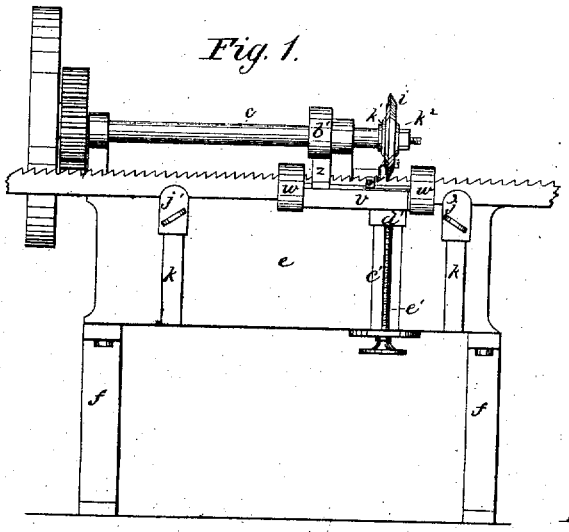
Figure 2:
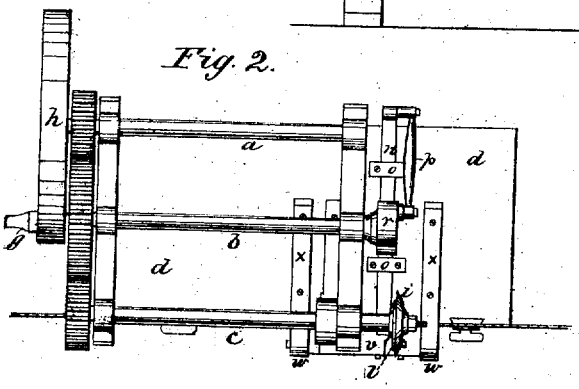
Figure 3:
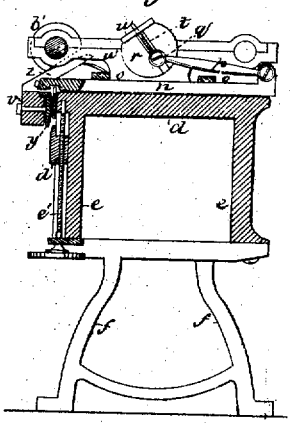
Figure 4:
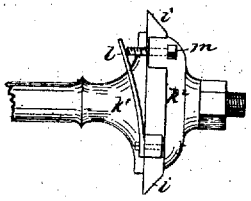
Figure 5:
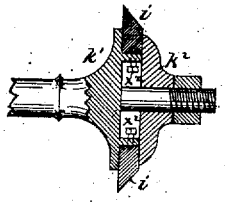
Figure 6:
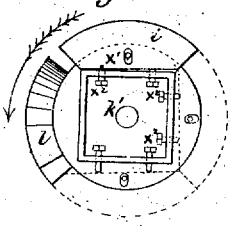

Figure 1 is a side elevation; Fig. 2, a top view; Fig. 3 a transverse vertical section. Fig. 4 is a detail edge view of the file with setting and clamping devices; Fig. 5, a sectional view of the same; Fig. 6, an end or side view of the file and head, with one of the clamp-plates removed.

This invention relates to a machine that accurately files, sets, and feeds a saw, and is provided with means for adapting itself to saws of any and all widths, and for giving the teeth a set of any required degree of inclination.

Its main features consist, first, in the combination, with a rotary file arranged to cut always in the same plane for all parts of the revolution, of a feeder arranged spirally in the arc of the file, and adapted to engage with the teeth of the saw, to feed the same one tooth each time; and, secondly, in the combination, with a feeding and clamping mechanism for the saw, of a bar arranged to vibrate at right angles to the line of saw-feed, and having faces upon opposite sides of said line, adapted to strike against the teeth of the saw to set the same.

Referring to the drawing, *a*, *b*, and *c* are three parallel shafts, mounted lengthwise of the top of a plate, *d*, that rests on plates *e*, which are supported at their ends on legs *f*. The three shafts all derive motion, either directly or indirectly, from the wrist *g* of the wheel *h*. On the end of the shaft *c* is the rotary annular file *i*, clamped between collars $k^1$ $k^2$. The file *i* has straight sides and a beveled periphery, as shown in Fig. 5, and sharpens both sides at once of each notch in the saw successively. The saw is supported in guides *j*, placed in vertical grooves *k* in one of the plates *e*. The guides may be moved up or down in the grooves, and are provided with set-screws, to fasten them wherever desired. After each notch is filed the saw should be slid along by the space of one tooth. This is done by means of a spiral feeder-plate, *l*, Figs. 4 and 6, whose base is a block that sits between the clamp-plates $k^1$ $k^2$, and forms a part of the same ring with the sections of the annular file. The spiral feeder-plate *l* stands off from side of the block, its outer edge being an arc with the same radius as the file *i*. The said plate *l* should be so much inclined that the distance between its outer end and the side of the file should be equal in all cases to the interval between the points of the particular saw that is being filed, in order that the saw may be moved the proper distance each time. The regulation of the plate to accomplish this object is effected by a set-screw, *m*.

In constructing the file *i* it is made in sections, as shown in Fig. 6, which sections are clamped between the plates $k^1$ $k^2$, and are adjusted outwardly away from the center, to produce a better action by causing the file to cut from point to heel. In adjusting the sections outwardly the same are loosely held in position by screws $x^1$, and are forced outwardly by the binding-screws $x^2$ $x^2$, which pass through a square flange upon the clamp-plate $k^1$. Now, by adjusting each section of the file a little farther out than the one preceding, by means of said screws $x^2$ $x^2$, as shown in dotted lines, the radius of the file constantly increases from point to heel, and thus produces a better cutting effect.

After a tooth is filed it has to be set. The setting is accomplished by means of a bar, *n*, that slides crosswise of the top of the plate *d* in suitable guides *o*, said bar or saw-set having a transverse notch in its under side, through which the saw-teeth pass one after another, and which has sides converging from the bottom upward. As this bar slides forward one of the inclined sides of its notch strikes one of the saw-teeth and sets it. As the bar slides backward the outer inclined side of its notch strikes the next tooth and sets that.

The saw-set is made thus to reciprocate by means of a pitman, *p*, that connects its rear end with a wrist-pin, *q*, stationed in a slot cut in the face of a disk, *r*, fixed on the end of the shaft *b*. As the wrist-pin revolves with the disk, its motion is communicated to the saw-set. The extent of the movement of the latter, and, by consequence, the amount of set given to the saw-teeth, are determined by the distance of the wrist-pin from the center of the disk *r*, and this distance is regulated by a screw, *t*, that passes through a plate, *u*, on one side of the disk, and, extending through the slot, enters the wrist-pin *q*, which is consequently moved in the slot by the turning of the same. While the teeth are being set and filed, both which operations take place at the same time, the saw-plate should be firmly clamped. The clamping is effected by a block, *v*, placed at the side of the said plate as it lies in its guideway, and suitably adjusted to perform its office. It may be suspended at its ends on journals which enter overhanging boxes *w*, the arms *x* of which are secured to the top of the plate *d*, said arms having grooves in their under sides, through which the saw passes, and said block being placed at a sufficient interval from the side of the plate *d* to allow the saw to slide between the latter and the block.

A steel plate, *y*, is attached to the inner side of the block *v*, in a recess of the same. An arm, *z*, having an upper inclined side, extends upward from the block *v* to a suitable distance, said arm being always pressed upon from beneath by a spring, *a'*, secured to the plate *d* under the arm. Immediately over the arm *z* is a segmental wheel or cam, *b'*, on the shaft *c*, which presses the arm *z* downward, and rotates the block *v* inward against the saw at just the moment when the file and saw-set begin to act upon the teeth.

The cam *b'* then passes the arm *z*, thus allowing the spring *a'* to raise it and rotate the block *v* backward away from the saw, at just the moment when the feeder-plate *l* begins to move the saw forward. The plate *y* is inclined backward, both upward and downward, from the central line of its inner face. In a vertical groove, *c'*, in the side plate *e* is a block, *d'*, pierced by a screw, *e'*, that extends lengthwise of the slot, and is supported in a plate, *f'*, at the bottom of the same.

The block *d'* has an upper facet, inclined parallel with the lower facet of the plate *y*. When the block *d'* is screwed up so far as to strike the plate *y* and throw the lower part of the block *v* outward, the upper part of said block and the upper facet of the plate *y* are moved nearer to the plate *d*, thus narrowing the space for the saw. The space for the saw is widened by the contrary operation of screwing the block *d'* downward.

With respect to the two main features of my invention, I am aware that it is not new to employ, in saw-filing machines, spiral files which file and feed at the same time, an instance of the same being shown in the patent to A. H. Burdine, granted September 14, 1858. This plan, however, is objectionable, for the reason that to produce the best filing effect the saw must be clamped and held stationary during the filing, while the feed is effected in the intervals. In the patent above referred to, both are effected simultaneously, and this takes place no matter whether the two spiral files are employed, or whether one spiral file and one spiral feeder are used, (which latter is described as a modification,) for in this latter case the spiral file and spiral feeder, although separate in function, nevertheless are so necessarily geared together as to still make the filing and feeding simultaneous. In defining more clearly, therefore, the scope of my invention, I would state that I only claim the feeder when it is arranged spirally in the arc of the filing-edge, and is combined with a rotary file which is not spiral, but arranged to cut always in the same plane for all parts of its revolution, or in a plane of coincident revolution.

In relation to the feature of the setting-bar *n*, also, I would state that a hammer-head has been arranged to operate at, or nearly at, right angles to the saw-blade, upon one side only, to set the alternate teeth, the intermediate ones being set at a second operation by turning the saw over, and, also, that jaws have been arranged to bite the sides of a saw-tooth to set it; and I, therefore, only claim a vibrating setting-bar when it has two sides or faces upon opposite sides of the saw-teeth, so as to set all of the teeth as the saw is fed, by striking in its alternate strokes the alternate teeth, to set them in opposite directions.

Having thus described my invention, what I claim as new is—

1. The combination, with a rotary file arranged to cut always in the same plane, as described, of a feeder arranged spirally in the arc of the filing-edge, substantially as described, and for the purpose set forth.

2. The combination of a rotary file arranged to cut always in the same plane, as described, and a feeder arranged spirally in the arc of the file, with a guideway and clamp adapted to hold the saw during the process of filing, substantially as described.

3. The combination, with a feeder and a clamp for holding the saw, of a bar arranged to vibrate at right angles to the line of saw-feed, and provided with faces upon the opposite side of the line of said feed, adapted to strike against the teeth of the saw to set the same, substantially as described.

4. The rotary annular file *i*, in combination with the spiral feeder-plate *l*, as specified.

5. The rotary annular file, made in sections, as and for the purpose described.

6. The rotary annular file, made in sections, and provided with independent means for adjusting them outwardly to produce an increasing radius.

7. The file *i*, made in sections, loosely held by screws $x^1$, and adjusted outwardly by set-screws.

8. The file *i*, made in sections, and combined with the clamp-plate $k^1$, having a flange and the set-screws $x^2$, arranged in said flange to adjust the sections outwardly, as and for the purpose described.

9. The reciprocating saw-set $n$, in combination with the adjustable wrist-pin $q$ and disk $r$, as described.

10. The vibrating block $v$, in combination with the arms $z$ and eccentric $b'$, as set forth.

11. The vibrating block $v$, in combination with the plate $y$ and adjustable block $d'$, as explained.

12. The improved saw filing and setting machine, formed by the combination of rotary file $i$, saw-set $n$, vibrating block $v$, and the parts connected therewith, for operating upon and feeding a saw, as set forth.

13. The combination, with the rotary file and the spiral feeder-plate, arranged in the arc of the file, of a set-screw, $m$, adapted to adjust the inclination of the feeder-plate to the different-sized teeth of different saws, substantially as described.

THOMAS L. SHAW.

Witnesses:
MILTON T. BARLOW,
F. B. BRYANT.